Jan. 8, 1963  E. M. RAMBO ET AL  3,071,859
CHEESE MOLDING MACHINE
Filed Jan. 11, 1961  3 Sheets-Sheet 1

Eivind M. Rambo
John M. Frigo
INVENTORS

BY *Clarence A. O'Brien*
*and Harvey B. Jacobson*
Attorneys

Jan. 8, 1963  E. M. RAMBO ET AL  3,071,859
CHEESE MOLDING MACHINE

Filed Jan. 11, 1961  3 Sheets-Sheet 2

Eivind M. Rambo
John M. Frigo
INVENTORS

BY Clarence A. O'Brien
and Harvey B. Jacobson
Attorneys

Jan. 8, 1963

E. M. RAMBO ET AL 3,071,859

CHEESE MOLDING MACHINE

Filed Jan. 11, 1961

Eivind M. Rambo
John M. Frigo
INVENTORS

United States Patent Office 3,071,859
Patented Jan. 8, 1963

3,071,859
CHEESE MOLDING MACHINE
Eivind M. Rambo, Rte. 1, Ogdensburg, Wis., and
John M. Frigo, Lena, Wis.
Filed Jan. 11, 1961, Ser. No. 82,007
7 Claims. (Cl. 31—42)

The present invention relates to a machine which initially shapes, molds and squeezes cheese curds into cylindrical form.

The type of machine made in accordance with this invention is for the purpose of replacing hand molding of many types of cheeses to thereby more uniformly, rapidly and effectively remove air, moisture and free fat from a cheese curd as it is knitted into predetermined cylindrical form. The machine of this invention therefore, constitutes an improvement over the machine disclosed in my prior Patent No. 2,929,142 in that it accomplishes similar objectives in a more efficient manner and has several distinct advantages thereover.

It is therefore an important object of this invention to provide a cheese molding machine which is capable of continuously and uninterruptedly knitting and molding a cheese curd without any limitation on the length of the operation which may be selectively stopped at the proper time when the cheese curd has been properly knitted.

A further object of this invention is to provide a cheese molding machine which is continuously operable to properly knit a cheese curd into cylindrical form with the proper squeezing pressure being applied thereto only during mold conditioning of the curd knitting mechanism.

A still further object of this invention is to provide a cheese molding machine which may be operatively conditioned by a mere simple manipulation and which machine is locked in operative cheese molding condition when desired.

An additional object of this invention is to provide a cheese molding machine having the above noted attributes and also being of such mechanical design that a plurality of such machines may be ganged for simultaneous operation, to mold a plurality of cheese curds at the same time.

A still further object of this invention in accordance with the foregoing objects, is to provide a cheese molding machine of such unique compact design, that the machine may be operated partly or wholly submerged in hot water so as to maintain the cheese curd and machine at the proper operating temperature without resort to hot water sprays.

Other objects of this invention include the provision of a cheese molding machine which is adjustable to a greater degree and operatively more flexible than machines heretofore used for similar purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
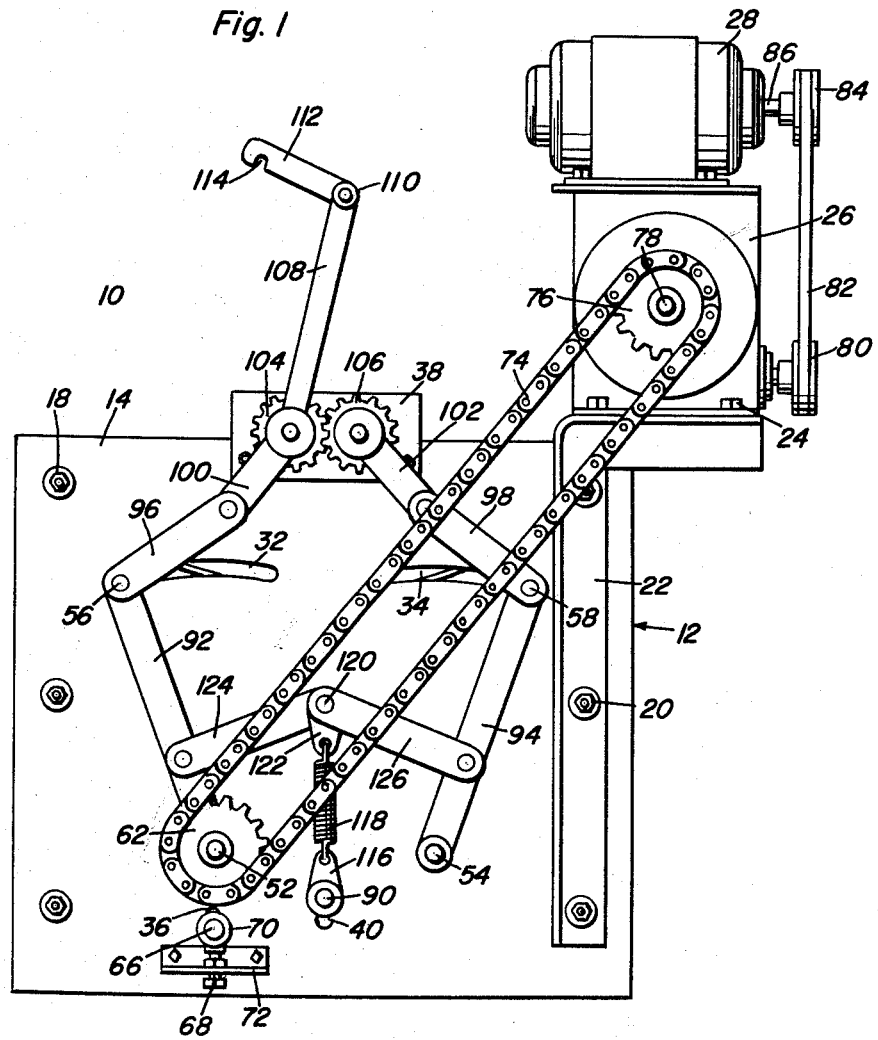
FIGURE 1 is a front elevational view of the cheese molding machine of this invention in a non-molding condition.
Figure 6:
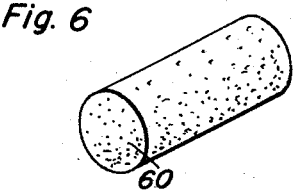
FIGURE 6 is a perspective view of the cylindrical cheese curd formed by the cheese molding machine of this invention.
Figure 4:
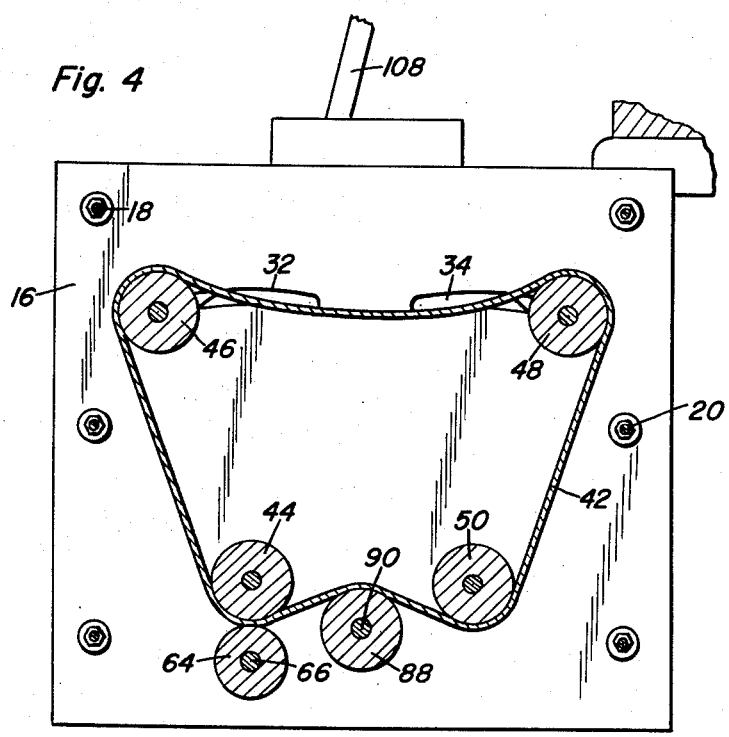
FIGURE 4 is a sectional view of the cheese molding machine in a condition corresponding to that illustrated in FIGURE 1.

Referring now to the drawings in detail, FIGURES 1 and 4 illustrate the cheese molding machine in an open position preparatory to the reception of a cheese curd prior to molding thereof. It will therefore be observed from FIGURES 1 and 2 that the cheese molding machine generally indicated by reference numeral 10 includes a frame assembly generally indicated by reference numeral 12. The frame assembly 12 includes a pair of similarly constructed mounting plates 14 and 16 which are disposed parallel to each other. The plates 14 and 16 are interconnected in spaced relation to each other by a plurality of connecting bolt members 18 on one side thereof while a plurality of connecting bolt members 20 on the other side thereof also interconnect the plates 14 and 16 and at the same time fasten to the plates supporting members 22. The supporting members 22 have mounted thereon by means of a plurality of fasteners 24 a reduction gear transmission 26 on top of which a drive motor 28 is anchored by a plurality of fasteners 30. It will also be observed that the plates 14 and 16 have formed therein a pair of arcuate slots 32 and 34 and an adjustment slot 36 adjacent the bottom of the plates for purposes as will hereinafter be explained. Also, gear mounting plate members 38 are fastened to the plates 14 and 16 adjacent the top thereof which mounting plates 38 extend upwardly above the plates 14 and 16. It will also be observed that the drive motor 28 and gear reducer transmission 26 are disposed above the mounting plates 14 and 16 for purposes as will hereafter become apparent. The plates 14 and 16 also include a second vertically disposed slot 40 serving an additional purpose as will hereafter become apparent.

Figure 5:
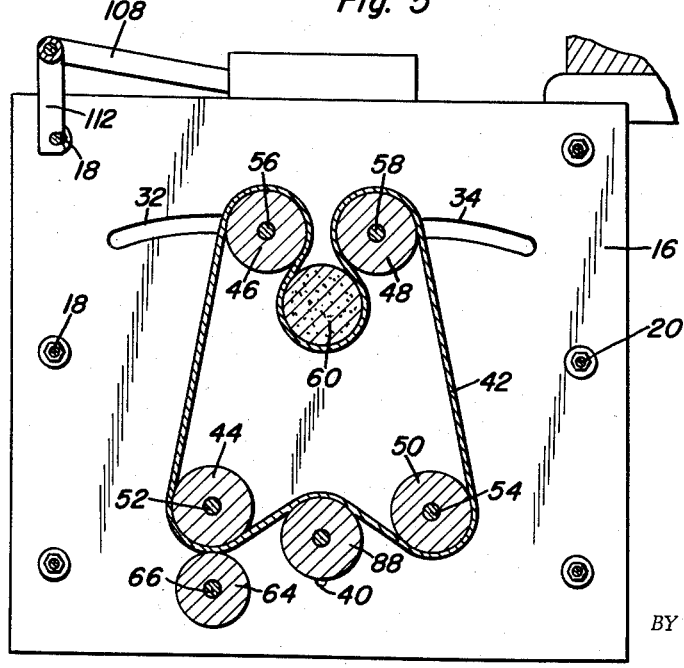
FIGURE 5 is a sectional view of the cheese molding machine similar to the view of FIGURE 4 taken through a plane indicated by the section line 5—5 in FIGURE 2.

Referring now to FIGURES 4 and 5 in particular, it will be observed that an endless belt 42 is operatively mounted between the mounting plates 14 and 16 and trained over a plurality of rollers 44, 46, 48 and 50. The roller 44 constitutes the drive roller for the belt 42 and is rotatably mounted between the plates 14 and 16 on a fixed axis by means of shaft 52. The roller 50 is also rotatably mounted between the plates on a fixed axis by means of shaft 54. The rollers 46 and 48 on the other hand, while constituting idler rollers, are rotatably mounted between the plates 14 and 16 on movable axes which extend through mounting shafts 56 and 58 for the rollers 46 and 48, respectively, which shafts are respectively movable within the arcuate slots 32 and 34. It will also be observed, that the arcuate slots 32 and 34 are respectively centered about the axes extending through the fixed shafts 52 and 54 so that the belt portions extending between the rollers 44 and 46 on one side and 50 and 48 on the other side will not be varied in length by virtue of movement of the rollers 46 and 48 which movement is guided by the slots 32 and 34. It will therefore be observed in FIGURE 4, that when the rollers 46 and 48 are moved away from each other within the slots 32 and 34 to an extreme separated position, the upper run of the belt 42 will be in a minimum slack condition so as to receive thereon a cheese curd preparatory to molding thereof. In FIGURE 5, the rollers 42 and 48 are in their opposite extreme position wherein they are closest to each other so that the upper run of the belt 42 will be in its slackest condition to thereby form a loop about the cheese curd 60 for molding thereof. The molding of the cheese curd 60 is therefore accomplished by movement of the belt 52 so as to properly knit the cheese curd surfaces, while the belt is placed under proper tension so that it may apply pressure to the cheese curd 60 for removal therefrom of air, moisture and free fat.

Figure 2:
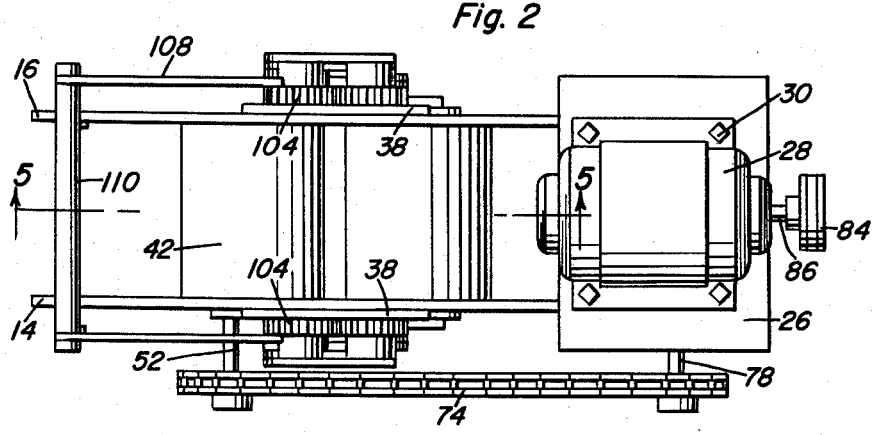
FIGURE 2 is a top plan view of the cheese molding machine as illustrated in FIGURE 3.

Referring therefore to FIGURES 1 and 2, the drive mechanism for imparting movement to the belt 42 may be discerned. It will therefore be observed that the shaft 52 to which the drive roller 44 is connected has connected at an end thereof on the outside of the plate 14 a sprocket wheel 62. Power is accordingly imparted to the drive roller 44 for movement of the belt 42. However, it should be realized that the proper pressure must be applied between the belt and the roller 44 in order for the roller to transmit motion to the belt. Therefore, as seen in FIGURES 4 and 5, a drive assist roller 64 is rotatably mounted between the plates 14 and 16 on a shaft 66 which is slidably adjustable within the slot 36 as more clearly seen in FIGURE 1. The position of the shaft 66 may therefore be adjusted by an adjustment screw mechanism 68 which is connected to an external end of the shaft 66 by means of member 70, the screw 68 being threadedly received within a bracket 72 fixed to the plate 14. By adjusting the position of the roller 64 through the adjustment screw 68, the proper pressure may be applied to the belt 42 for causing movement thereof upon rotation being imparted to the drive roller 44.

It will be observed that an endless drive chain 74 is trained about the drive sprocket wheel 62 at one end while at the other end an input sprocket wheel 76 engages the sprocket chain belt 74 for movement thereof. The sprocket wheel 76 is connected to the end of an output shaft 78 which is driven through the gear reduction transmission 26. An input pulley wheel 80 to the transmission 26 is belt connected by means of pulley belt 82 to the drive pulley 84 connected to the motor shaft 86 of drive motor 28. Accordingly, rotation may be imparted to the sprocket wheel 62 and the drive roller 44 at the proper operating speed.

It will be recalled that upon conditioning the belt 42 for molding by formation of the loop at the upper run thereof, the tension applied to the belt must be simultaneously increased so as to apply the proper squeezing pressure to the cheese curd 60 received within the belt loop. A belt tensioning roller 88 is therefore provided for the purpose and is rotatably mounted between the plates 14 and 16 by means of a shaft 90 which is movable within the slots 40. Accordingly, when the belt 42 is conditioned for molding as illustrated in FIGURE 5, the tensioning roller 88 will be moved upwardly relative to the slot 40 to its extreme upward position in which it applies the maximum tension to the belt 42 for accomplishing the squeezing pressure hereinabove indicated. Mechanism must therefore be provided for simultaneously moving the tensioning roller 88 to its upward position with movement of the loop forming rollers 46 and 48 toward each other as illustrated in FIGURE 5.

Figure 3:
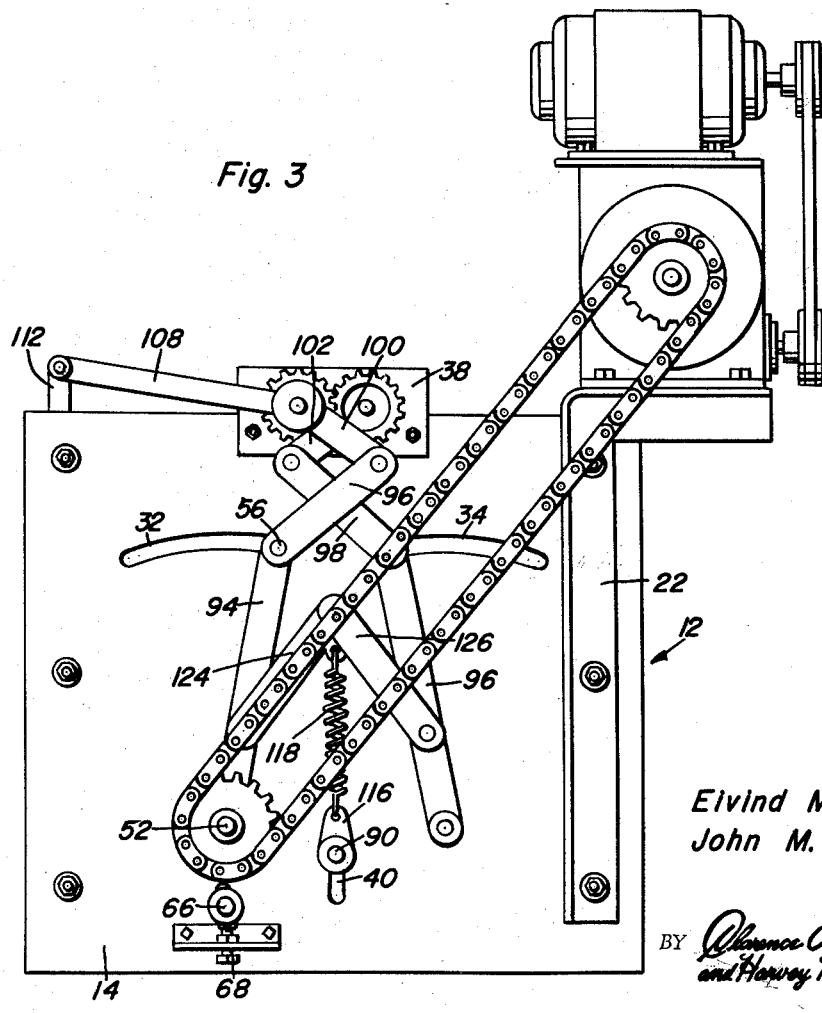
FIGURE 3 is a front elevational view of the cheese molding machine illustrated in a locked cheese molding condition.

Referring therefore to FIGURES 1 and 3, it will be observed that the external ends of the shafts 56 and 58 for the loop forming rollers 46 and 48 have connected thereto lever members 92 and 94. The lever members 92 and 94 are pivoted about the fixed axes extending through the shafts 52 and 54. Also, pivotally connected to the respective shafts 56 and 58 are a pair of link members 96 and 98 which, in turn, are pin-connected to arms 100 and 102 fixed to a pair of intermeshing gear members 104 and 106. The gear members 104 and 106 are rotatably mounted by means of the gear mounting members 38 fastened to the plates 14 and 16. Accordingly, upon rotation of one of the gear members, opposite rotation will be imparted to the other gear member so that the arm members 100 and 102 will be pivoted in opposite directions so as to move the shafts 56 and 58 toward or away from each other. An operating lever 108 is therefore connected to one of the gear members 104 in order to effect the aforementioned movement of the shafts 56 and 58 toward or away from each other to thereby move the rollers 46 and 48 toward or away from each other for conditioning the belt 42. It will be noted that the gear members 104 on the sides of the frame assembly 12 have their operating levers 108 interconnected by a connecting pin member 110 to which a lock link member 112 is connected. A notch 114 is formed at the end of the lock link member 112 so that when the operating lever 108 is in a position corresponding to that of FIGURE 5 wherein the rollers 46 and 48 are in their extreme position closest to each other in order to form the cheese molding loop in the belt, the lever 108 may be locked in said position by means of the link 112 since the notch 114 therein may then engage the shank of the uppermost connecting bolt member 18.

It will be noted that the external end of the tensioning roller shaft 90 has connected thereto an ear member 116 to which the lower end of a spring 118 is connected. The upper end of the spring 118 is connected to a toggle pin 120 by means of ear member 122. A pair of toggle links 124 and 126 which are interconnected by the toggle pin 120 are connected at their respective outer ends to the lever members 92 and 94. Accordingly, as seen in FIGURE 1 when the lever members and belt conditioning rollers 46 and 48 are in their position away from each other, the toggle pin 120 will apply only a minimum tensioning force through the spring 118 to the tensioning roller shaft 90. However, when the conditioning rollers 46 and 48 are in their cheese molding position as seen in FIGURE 5, the lever members 94 and 92 will be in the position illustrated in FIGURE 3, in which case the toggle links 124 and 126 apply maximum tensioning force through the spring 118 so as to move the tensioning roller 88 to its uppermost position and apply maximum tension to the belt 42.

From the foregoing description, operation and utility of the cheese molding machine of this invention will be apparent. Furthermore, it will be appreciated that the compact nature of the machine and the particular drive arrangement renders it especially useful for ganging a plurality of such machines for simultaneous operation from a single drive mechanism. Accordingly, when a plurality of such machines are to be ganged a common drive shaft may replace the sprocket wheels 62 with the power being imparted to one end of said common drive shaft. It will also be appreciated, that by virtue of the disposition of the motor 28 and transmission 26 as well as the gear mounting plate 38 above the belt 42, the machine may be partially submerged within water so that the molding operation of the belt on a cheese curd may occur under hot water so as to perform the cheese curd molding at the proper operating temperature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cheese molding machine comprising a support, a pair of relatively movable, horizontally disposed, substantially parallel rolls on said support, at least one additional roll on the support parallel to and vertically spaced from said pair of rolls, an endless belt extending around said rolls, a belt-tightening roll resiliently urged against said belt between one of said pair of rolls and said additional roll, and said belt having a loop therein between said first pair of rolls.

2. The combination of claim 1, said support including a pair of spaced, opposed plates receiving the rolls and the belt therebetween.

3. The combination of claim 2, together with a drive roll journaled between the plates and cooperable with said additional roll for actuating the belt.

4. The combination of claim 3, said plates having slots therein, said pair of rolls being operable toward or away from each other in said slots for closing or opening the loop.

5. The combination of claim 4, together with common means for manually shifting said pair of rolls toward each other and for simultaneously actuating the belt-tightening roll for tightening the belt.

6. The combination of claim 5, said means comprising pairs of levers pivotally mounted on the plates and carrying said pair of rolls, toggles connecting said pairs of levers, resilient means operatively connecting said toggles to the belt-tightening roll, and means for actuating the levers in unison.

7. The combination of claim 6, the last-named means including pairs of meshed gears rotatably mounted on the plates, arms affixed to said gears, links operatively connecting said arms to the levers, operating levers affixed to certain of the gears, and a connecting member connecting the operating levers for operation in unison.

References Cited in the file of this patent

UNITED STATES PATENTS

| 2,567,957 | Miollis | Sept. 18, 1951 |
| 2,627,223 | Berge | Feb. 3, 1953 |
| 2,908,973 | Berge | Oct. 20, 1959 |
| 2,929,142 | Rambo et al. | Mar. 22, 1960 |

FOREIGN PATENTS

| 46,361 | Germany | Mar. 14, 1889 |